(No Model.)
J. C. HENRY.
MOTOR GENERATOR.
No. 524,852. Patented Aug. 21, 1894.
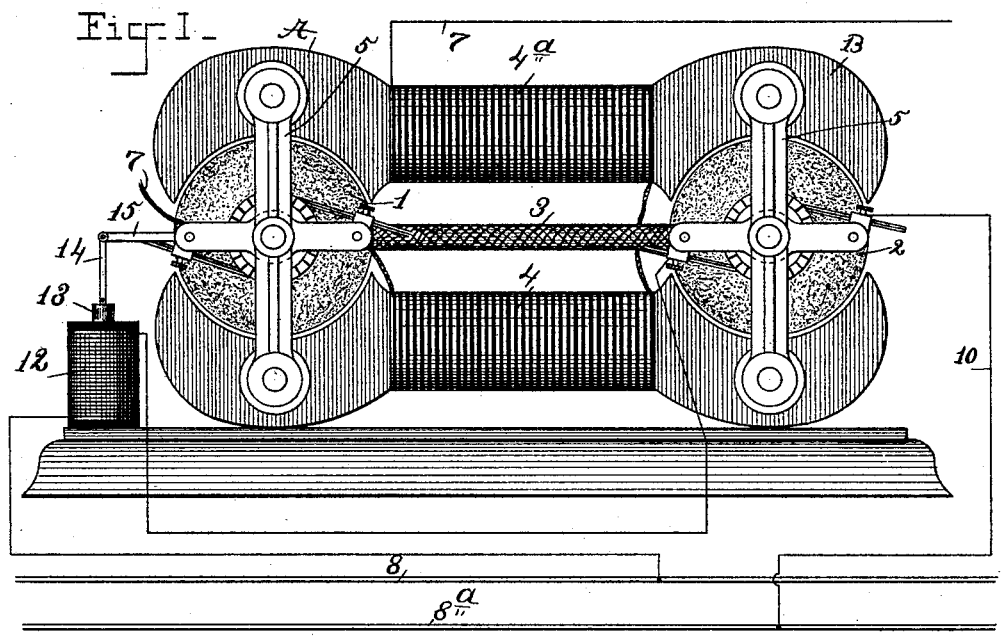
Fig. I.
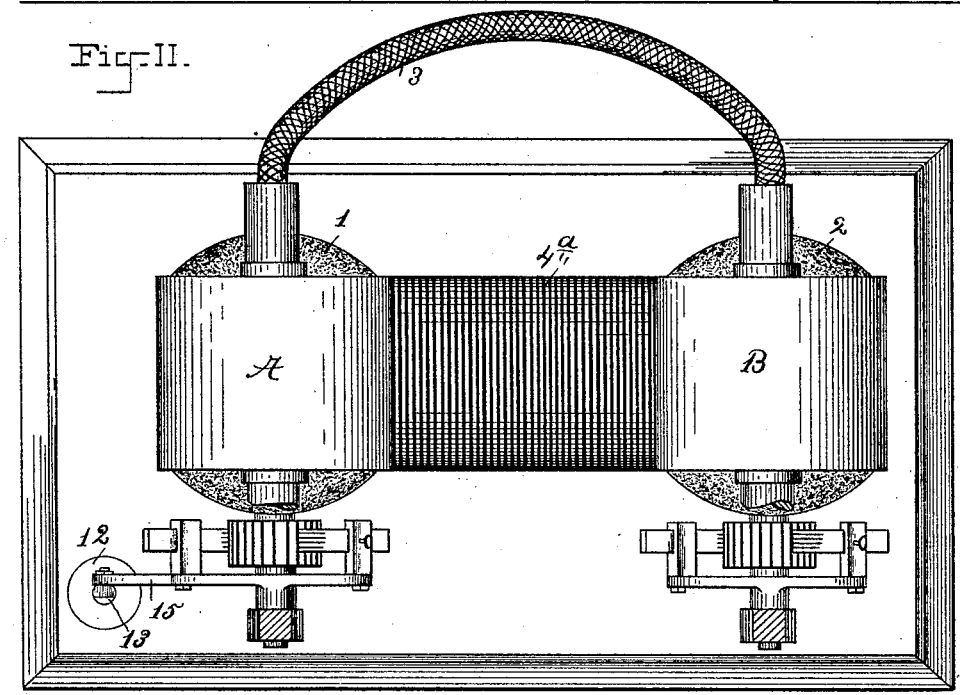
Fig. II.
Witnesses
Lillie Hanna
L. Woolsey.
Inventor
John C. Henry
By
Attys.

UNITED STATES PATENT OFFICE.

JOHN C. HENRY, OF WESTFIELD, NEW JERSEY.

MOTOR-GENERATOR.

SPECIFICATION forming part of Letters Patent No. 524,852, dated August 21, 1894.

Original application filed December 18, 1891, Serial No. 415,499. Divided and this application filed January 28, 1893. Serial No. 460,001. (No model.)

*To all whom it may concern:*

Be it known that I, JOHN C. HENRY, a citizen of the United States, residing at Westfield, county of Union, State of New Jersey, have invented certain new and useful Improvements in Motor-Generators, of which the following is a specification.

The subject of the present invention is a compact and simple motor generator having its armature shafts connected by flexible shafting, the flexibility of which renders the motor generator of special utility in electric railway systems such as described in my application, Serial No. 415,499, dated December 18, 1891, of which the present application is a division.

Referring to the accompanying drawings which form a part of this specification:—Figure I is a side elevation of the motor generator and Fig. II, a top view of the same.

1 and 2 are two wire wound armatures having the ends of their shafts coupled by flexible shafting 3 and rotating in the constant field induced by the magnets 4, $4^a$ which are wound in series with the motor armature 1. I have shown the lower magnet 4 carried by a base piece and having supporting brackets or hangers 5, 5 which carry the upper magnet $4^a$, the armature journals and the brushes.

One side A, of this machine containing the armature 1 forms a motor; the other side B containing the armature B forms the dynamo adapted to be driven by said armature through the medium of flexible shafting 3.

8, $8^a$ are the track rails or other conductors of a translating circuit supplied with current by the wires 10 from the generator armature 2 while 7 is the conductor supplying current from a source of electricity (not shown) to the field magnet coils 4, $4^a$ and the armature 1. I prefer to have the track rails or conductors of the translating circuit in the shape of continuous conductors instead of in sections where a number of motor generators A, B are arranged along and connected at intervals to said translating circuit so that the said conductors 8, $8^a$ tie the separate dynamos of the several motor generators together and an abnormal drain of current in any particular locality will be distributed by the conductors 8, $8^a$ over all the motor generators located along the line directly in proportion to the resistance between the several motor generators and the point where the current is translated.

To enable the motor generators to supply the varying demands upon them, I cause any change in the amount of current supplied to the working conductors by the generators B to re-act upon the motor A and increase the torque of the armature 1 thereof. To this end, I interpose in the conductor 10 a solenoid or electro-magnet 12 and mechanically connect the movable core 13 thereof by a rod 14 with the lever 15 so connected with the brush holders as to transmit to the latter any motion of the said core. With this arrangement, any variation of current in the conductor 10 varying the influence of the solenoid 12 on its core 13 will cause the shifting of the brushes of the motor A so as to increase the torque of the armature 1 thereof when any additional current is flowing on the conductor 10 and diminishing such torque with any diminution of said current. In this manner, any increase or decrease in the current flowing on wire 10 caused, for example, by increase in the load of an electric car traveling along conductors 8, $8^a$, will cause a corresponding increase or decrease of the torque of armature 1 which re-acts upon the shaft of armature 2 mechanically. The same results may be secured by having the core of the solenoid stationary and the magnet coil secured to the brushes without departure from the spirit of my invention.

Having thus described my invention, the following is what I claim as new therein and desire to secure by Letters Patent:

1. In an electro-magnetic machine, the combination of suitable fields, two armatures revolving in relation thereto, and flexible shafting mechanically coupling the shafts of said armatures.

2. In a converting system, the combination with the armature of a constant current motor, the armature of a constant potential dynamo (said armatures being mechanically connected together); and a constantly magnetized field for said armatures, of a solenoid in circuit with the generator armature and having its core mechanically connected to the motor commutator brushes for regulating the torque of the motor armature.

JOHN C. HENRY.

Witnesses:
M. V. BIDGOOD,
L. WOOLSEY.